United States Patent [19]

Shimura

[11] Patent Number: 5,043,718
[45] Date of Patent: Aug. 27, 1991

[54] SELECTIVE PAGING SYSTEM AND PAGING RECEIVER THEREFOR

[75] Inventor: Kazuhiro Shimura, Mizuho, Japan

[73] Assignee: Casio Computer Co., Ltd., Tokyo, Japan

[21] Appl. No.: 409,040

[22] Filed: Sep. 18, 1989

[30] Foreign Application Priority Data

Sep. 20, 1988 [JP] Japan .............................. 63-235449

[51] Int. Cl.$^5$ ............................................. H04B 7/00
[52] U.S. Cl. ............................ 340/825.44; 340/825.47
[58] Field of Search ............ 340/311.1, 825.44, 825.47, 340/825.52, 825.26, 825.27; 379/56, 57; 455/31, 32, 38, 343

[56] References Cited

U.S. PATENT DOCUMENTS

| | | | |
|---|---|---|---|
| 4,742,516 | 5/1988 | Yamaguchi | 340/825.44 |
| 4,783,654 | 11/1988 | Ichikawa | 340/311.1 |
| 4,818,987 | 4/1989 | Ide et al. | 340/825.47 |
| 4,821,021 | 4/1989 | Ide et al. | 340/311.1 |
| 4,845,491 | 7/1989 | Fascenda et al. | 340/825.44 |

Primary Examiner—Donald J. Yusko
Assistant Examiner—Dervis Magistre
Attorney, Agent, or Firm—Frishauf, Holtz, Goodman & Woodward

[57] ABSTRACT

Each pager includes a receiver for receiving a transmission signal including an address and a message from a base station, a frame register for holding the number of transmission frame assigned to the pager, a common frame register for holding the number of a transmission frame commonly used by a plurality of pagers assigned with a transmission frame different from the transmission frame assigned to the pager, address registers for holding a specific address number of the pager and an address number common to a plurality of pagers and a controller. The a controller switches on the receiver in a predetermined period including a plurality of frames stored in the frame register, comparators for comparing the address of the signal received by the receiver with the addresses stored in the address registers. A message decoder fetches a message when the comparator detects a coincidence.

13 Claims, 12 Drawing Sheets

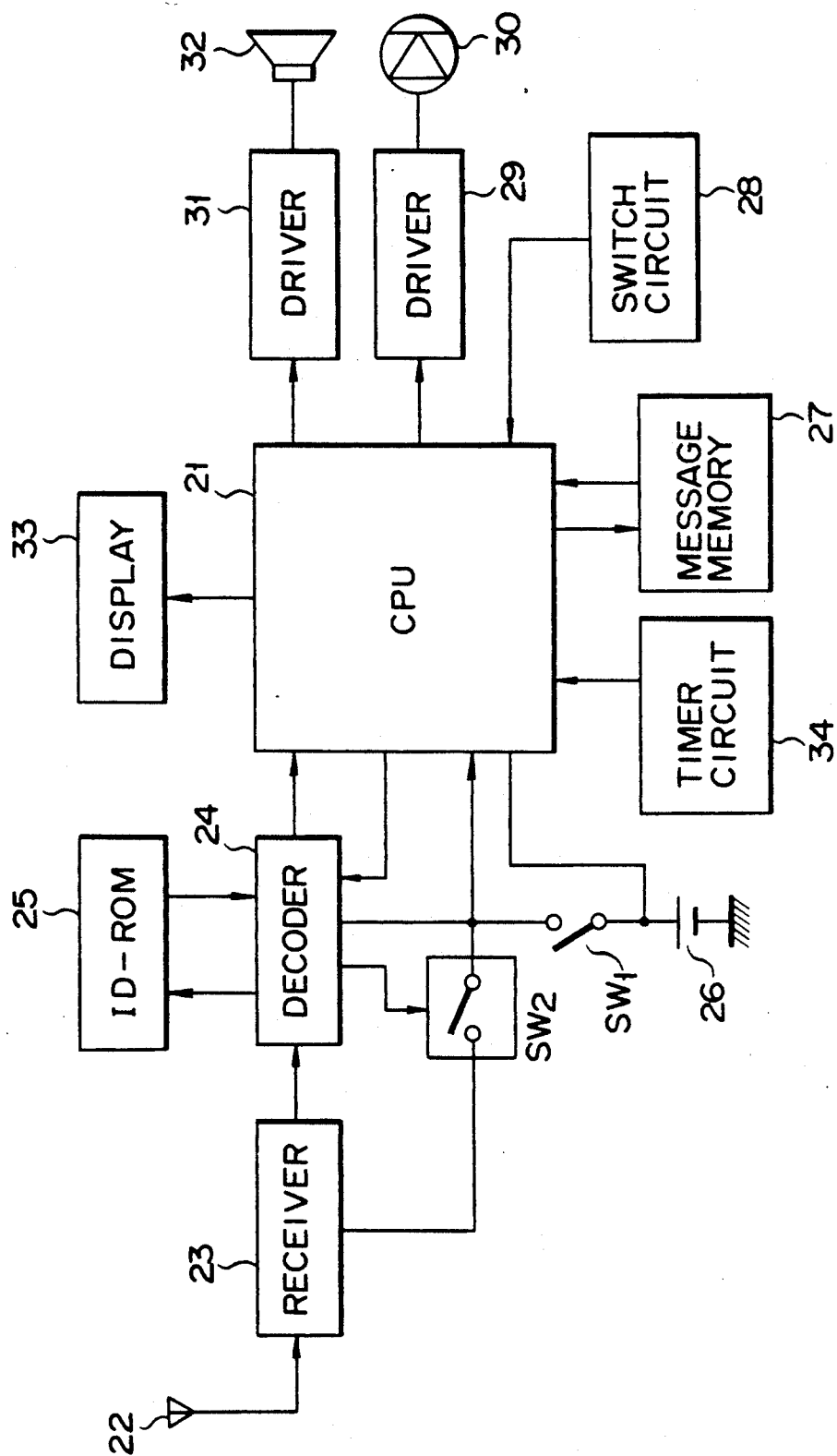
F I G. 4

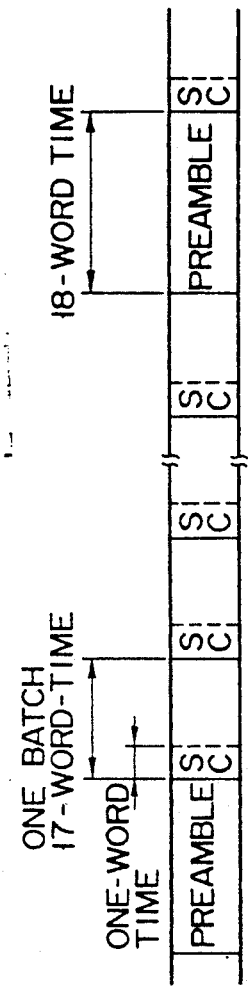
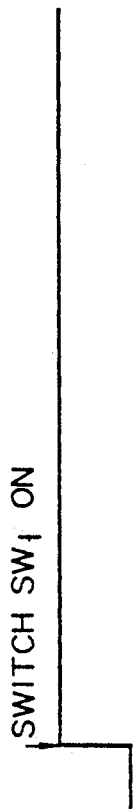
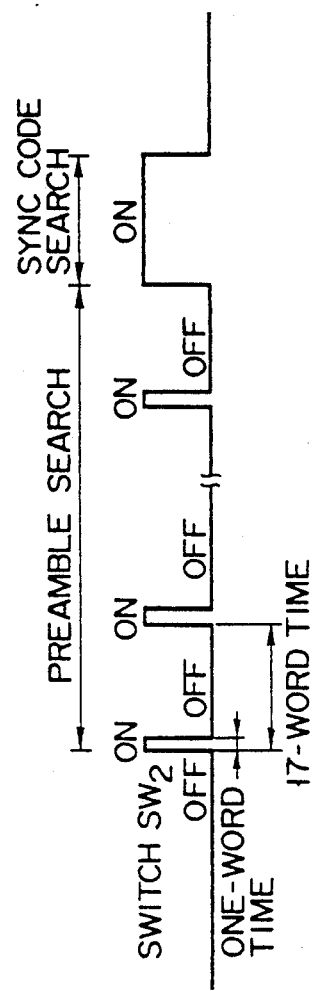
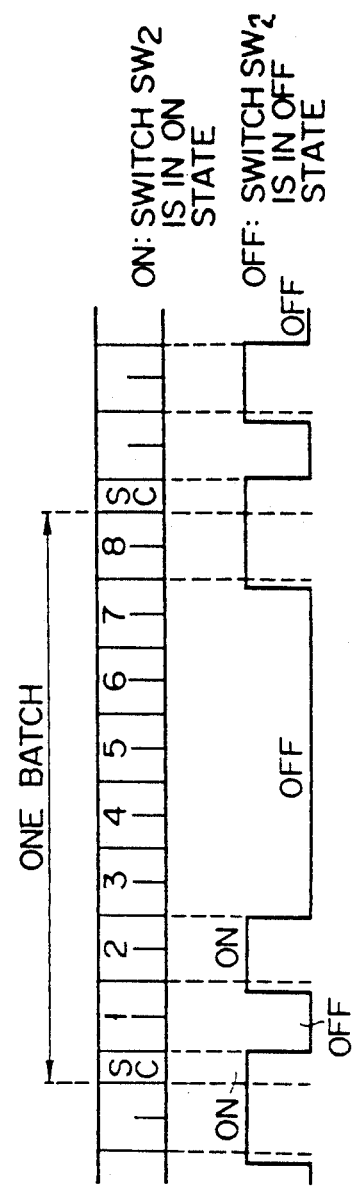
F I G. 9A
F I G. 9B
F I G. 9C
F I G. 10A
F I G. 10B

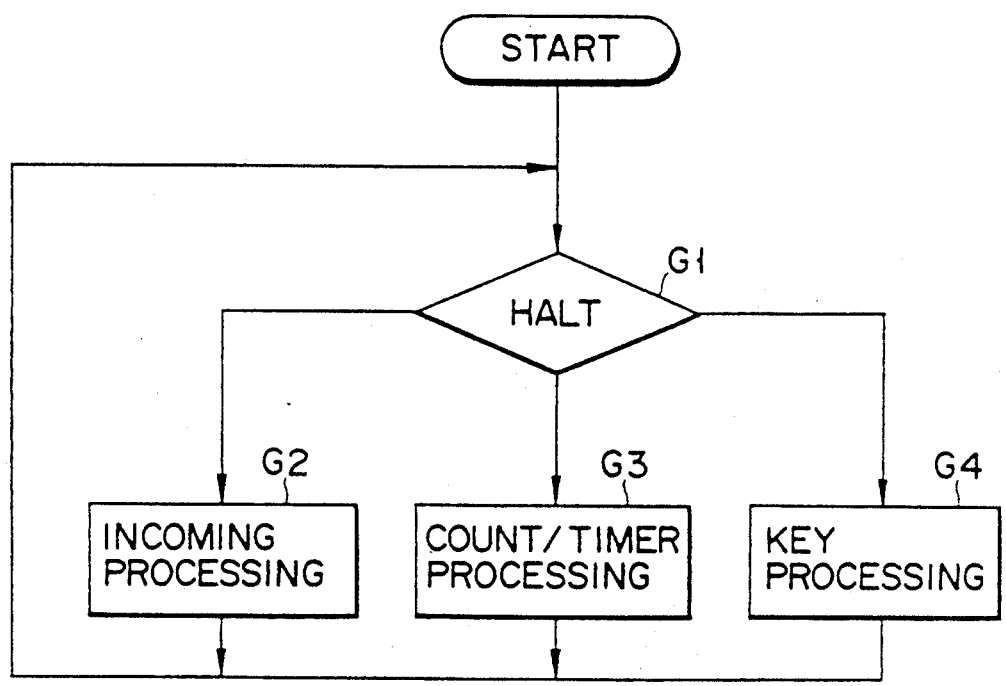
F I G. 11

SELECTIVE PAGING SYSTEM AND PAGING RECEIVER THEREFOR

BACKGROUND OF THE INVENTION

1. Field of the Invention

The present invention relates to a selective paging communication system and a receiver for use in the selective paging communication system.

2. Description of the Related Art

In a conventional selective paging communication system such as a selective paging communication system using a POCSAG code as a calling signal, paging receivers are divided into eight groups. A radio base station sends each of calling signals in one of eight frames in time-divisional mode in accordance with the grouping. Each paging receiver receives a calling only at a timing at which a frame corresponding to its own group is transmitted. That is, each paging receiver is time-divisionally paged. In addition, in order to prolong long the service life used in batteries of each paging receiver, a power source of the paging receiver is switched off at a timing at which the paging receiver is not called i.e., at a timing at which other frames are transmitted.

Recently, some information service companies utilize a selective paging communication system to provide stock price information, gold quotation information, and the like. In the conventional paging system using the individual calling number, however, since paging receivers of subscribers who receive information are allocated to one of 8 frames, an information service company must transmit the same information for all of the eight frames, resulting in a very low transmission efficiency.

SUMMARY OF THE INVENTION

The present invention has been made in consideration of the above situation and has as its object to provide a selective paging communication system which can efficiently transmit the same information to a plurality of paging receivers and a paging receiver for use in the selective paging communication system.

In order to achieve the above object, a paging system according to the present invention comprises a base station for transmitting a calling signal and a message signal; and a plurality of paging receivers (FIG. 3), each of said paging receivers receiving a calling signal from said base station, receiving a message signal next to a calling signal assigned to the paging receiver, and displaying a received message, said paging receivers being divided into groups, each of the groups being assigned with a transmission frame;

wherein said base station transmits an individual calling signal for individually calling a paging receiver by using one of specific transmission frames (1-7) assigned to a group to which said paging receiver belong, and transmitting a simultaneous calling signal for simultaneously calling at least two of the paging receivers which belong to at least two of the groups by using a predetermined transmission frame (8) which is one of the specific transmission frames (1-7) or different from said specific frames, and each of said paging receivers (FIG. 3) receives the calling signal for a predetermined period including a frame (2) of said specific frames (1-7) assigned to said paging receiver and said predetermined frame (8).

With the above arrangement, information can be efficiently transmitted to the paging receivers.

BRIEF DESCRIPTION OF THE DRAWINGS

FIG. 4 is a block diagram showing an arrangement of the paging receiver according to the embodiment of the present invention;

FIGS. 9A to 9C are timing charts for explaining a preamble search operation and a sync code search operation of the paging receiver;

FIG. 10A and 10B are timing charts showing a reception state of the paging receiver;

FIG. 11 is a flow chart for explaining an overall operation of the paging receiver according to the embodiment of the present invention;

DETAILED DESCRIPTION OF THE PREFERRED EMBODIMENT

An embodiment of the present invention will be described in detail below with reference to the accompanying drawings.

Figure 1A:
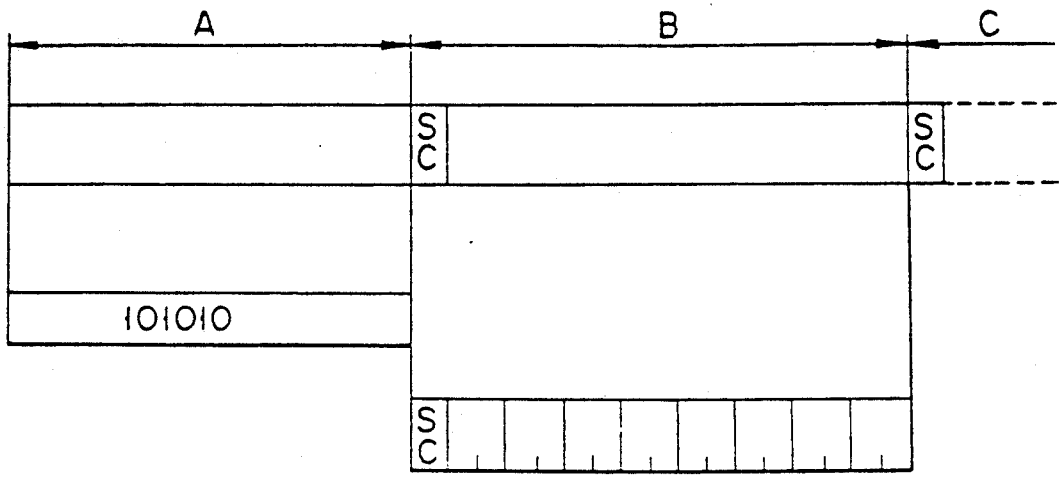
FIGS. 1A to 1D are views showing a transmission format for use in a selective paging communication system according to an embodiment of the present invention.
Figure 1B:
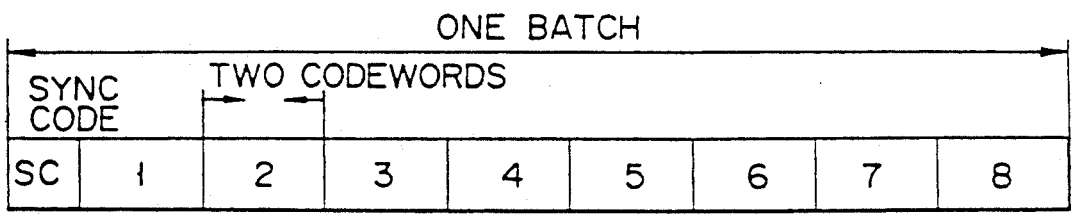
Figure 1C:
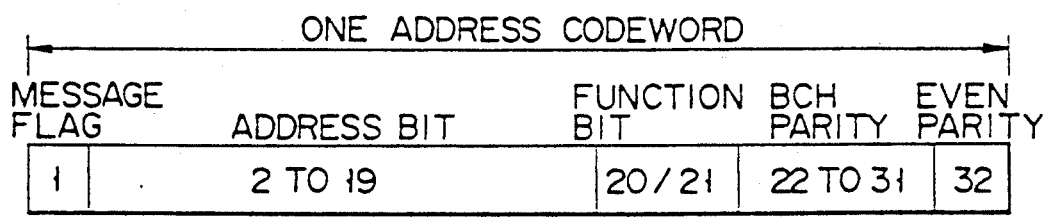
Figure 1D:
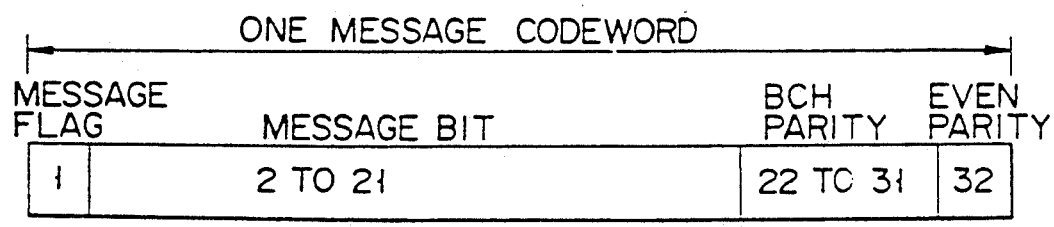

With reference to FIGS. 1A to 1D, a transmission signal format of a POCSAG (Post Office Code Standardization Advisory Group) code signal used in this embodiment will be described below. FIG. 1A shows an overall format of the POCSAG code signal. The transmission signal includes a preamble signal A and a plurality of subsequent batch signals B, C, . . . The preamble signal A establishes bit synchronization between the transmission signal and the receiver and includes "1010101 . . .", i.e., 576 successive bits of a repeating pattern of "1" and "0". FIG. 1B shows a format of each batch signal. Each batch signal includes a sync code SC and first to eighth frames. One frame includes two codewords. Each of the sync code SC and one codeword has 32 bits. The codewords are classified into an address codeword representing a calling number and a message codeword representing a message. FIGS. 1C and 1D show formats of the address and message codewords, respectively.

As shown in FIG. 1C, the address codeword includes a message flag for indicating whether the codeword is an address or message codeword at the first bit; address bits at the second to 19th bits; function bits for indicating a display state or an alarm state at the 20th and 21st bits; BCH parity bits at the 22nd to 31st bits; and an even parity bit at the 32nd bit. The numbers in this Figure indicate a digit position in the address codeword. A value of "0" used for the message flag indicates that an address codeword is set.

As shown in FIG. 1D, the message codeword includes a message flag ("1" indicating a message codeword is set) at the first bit; message bits at the second to 21st bits; BCH parity bits at the 22nd to 31st bits; and an even bit at the 32nd bit. The sync code SC has a specific 32-bit pattern.

In order to transmit a message, the address codeword is first transmitted, and then the message codeword of a required length is transmitted. Transmission is performed at a transmission speed of 62.5 ms per word (to be referred to as one-word time hereinafter). In order to avoid erroneous reception of the transmitted message, the same contents (an address and a message) are retransmitted after a predetermined time, for example 60 seconds.

Paging receivers are divided into seven groups for individual calling. Calling numbers for individual calling (including normal group calling) are transmitted using seven frames (e.g., first to seventh frames). Calling numbers for information service is transmitted using one frame (e.g., eight frame) different from the above seven frames.

Each of paging receivers is assigned with one (e.g., second frame) of the seven frames (e.g., the first to seventh frames) for individual calling. Paging receivers admitted to receive information from an information service company, is assigned with eighth frame. Each paging receiver receives transmitted signal in the period of the assigned frame or frames. Therefore, in this selective paging communication system, calling of a plurality of paging receivers can be efficiently performed.

In a case where the number of calling-numbers for transmitting information from the information service company is small, that is, the number of types of information to transmit to the paging receivers is small, some of paging receivers can be assigned with the frame other than the seven frames for individual calling.

Figure 2:
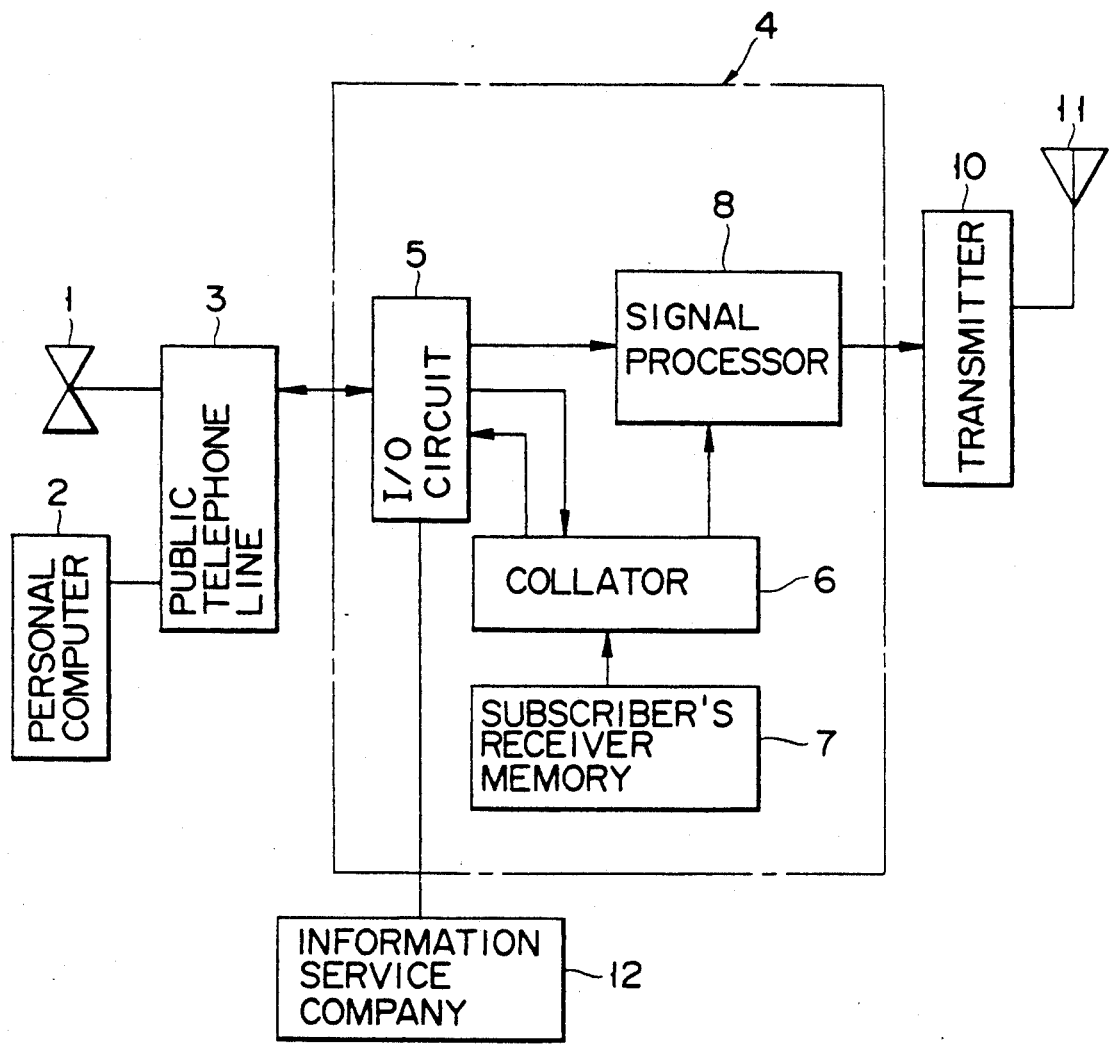
FIG. 2 is a block diagram showing an arrangement of a base station according to the embodiment of the present invention.

FIG. 2 is a block diagram showing a system configuration of a base station in a radio paging communication system. An arrangement of this base station will be described below. Referring to FIG. 2, a key telephone set 1 and a personal computer 2 with a communication function are input terminals for causing a caller to input a calling number of a paging receiver and a message thereto. The key telephone set 1 and the personal computer 2 are connected to a control center 4 through a public telephone line 3. The control center 4 includes an I/O circuit 5 connected to the public telephone line 3. The I/O circuit 5 includes a modem and an answering circuit. A calling number input by the caller at the key telephone set 1 or the personal computer 2 is input to a collator 6 through the public telephone line 3 and the I/O circuit 5. The collator 6 collates the input calling number with calling numbers of a plurality of subscriber's receivers stored in a subscriber's receiver memory 7. The subscriber's receiver memory 7 stores calling numbers including calling numbers for transmitting and receiving information from the information service company. The calling numbers for transmitting the information from the information service company are assigned to the information service companies, or to the types of the information to be transmitted to the paging receivers. In this collating processing, when the input calling number does not coincide with any one of the calling numbers stored in the memory 7, the collator 6 sends a command to the answering circuit in the I/O circuit 5 to cause the answering circuit to send to the caller a message "The designated calling number is not registered at present". When the input calling number coincides with one of the calling numbers stored in the memory 7, the collator 6 sends the input calling number which coincides with one of the stored calling numbers to a signal processor 8. At the same time, the collator 6 outputs one of the different commands based on different types of paging receivers in accordance with the destination paging receiver assigned with this calling number. The selected command is output to the I/O circuit 5 and the signal processor 8. When the type of paging receiver assigned with the input calling number coinciding with the stored calling number is a tone-only type having no display device, the collator 6 sends a command to cause the I/O circuit 5 to send a message "Calling is started. Please hang up the phone and wait" to the caller. The collator 6 sends a command to cause the signal processor 8 to send a paging signal.

When the type of paging receiver is a numeric display type, the collator 6 sends a command to the I/O circuit 5 to cause it to send a message "Please input a message" to the caller. In this case, the collator 6 sends a command to the signal processor 8 to cause it to treat the message data input from the caller as numeric code data. When the type of paging receiver is an alphanumeric display type, the collator 6 sends a command to the I/O circuit 5 to cause it to send a message "Please input a message" to the caller. In this case, the collator 6 sends a command to the signal processor 8 to cause it to treat the message data input from the caller as alphanumeric code data.

The signal processor 8 generates an address codeword corresponding to the calling number from the collator 6 and a message codeword corresponding to the caller's message data on the basis of the commands from the collator 6, and sends them as a paging signal code having a predetermined format to a transmitter 10. In this case, the address codeword is inserted in any one of the frames of the batch format shown in FIG. 1B on the basis of the calling number. The message codeword is transmitted next to the address codeword. If the message data from the caller cannot be assigned to one message codeword, a plurality of message codewords are generated and are continuously transmitted next to the address codeword. The transmitter 10 transmits the paging signal code from the signal processor 8 as a radio signal from an antenna 11.

In this embodiment, a transmission circuit of an information service company is connected to the I/O circuit 5 through an exclusive line. The information service company transmits various pieces of information to receivers as subscribers.

This base station performs individual calling and group calling by using the first to seventh frames, and transmits a calling signal from the information service company 12 by using the eighth frame. That is, address codewords for individual calling and group calling are transmitted in one of first to seventh frames and address codewords for information service are transmitted in eight frame.

An arrangement of the receiver will be described below.

Figure 3:
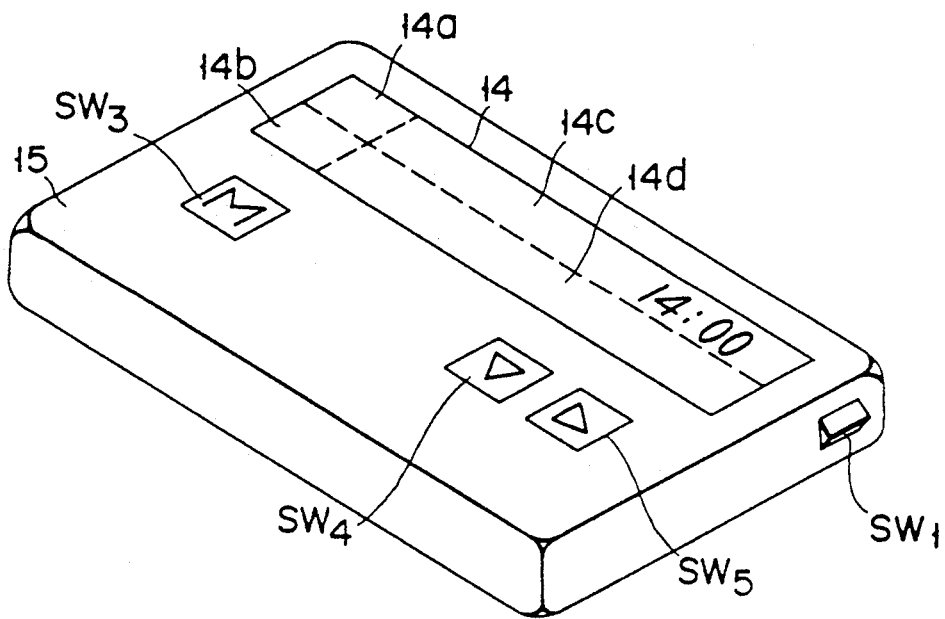
FIG. 3 is a perspective view showing an outer appearance of a paging receiver according to the embodiment of the present invention.

FIG. 3 shows an outer appearance of the receiver according to this embodiment. A receiver 15 has a main switch SW1 on its side surface and a display 14, a mode switch SW3, a readout switch SW4, and a page switch SW5 on its upper surface. Switch (not shown), for selecting whether a buzzer is driven or not when the receiver is called, is also provided to the receiver.

The display 14 includes a first subdisplay portion 14A, a second subdisplay portion 14B, a first main display portion 14C, and a second display portion 14D. The first subdisplay portion 14A displays whether a buzzer is driven when the receiver is called, a battery service life, and the like. When the receiver is called, the second subdisplay portion 14B displays the type of calling, the type of received information, and the like. The first and second main display portions 14C and 14D display the received message. At the right end of the first main display portion 14C, a reception time of the message is displayed while the message is displayed, and a current time is displayed in other cases.

The main switch SW1 is used to switch on/off a power source of the receiver. The mode switch SW3 is used to switch a mode. The mode of the receiver is switched each time the switch SW3 is operated. The readout switch SW4 is used to switch a display message. Each time the switch SW4 is operated, the display 14 selectively displays past messages received and stored in an internal memory. The switch SW5 is usedtto switch type of displayed information from the information service company.

An internal arrangement of the receiver shown in FIG. 3 will be described below with reference to FIG. 4.

As shown in FIG. 4, the paging receiver of this embodiment includes a CPU 21.

The CPU 21 controls each circuit in accordance with programs stored in an internal ROM. Referring to FIG. 4, a radio wave received by an antenna 22 is supplied to a receiver 23 for demodulating the radio wave. The ID-ROM 25 stores a frame number, an address, and the like assigned to the receiver. The ID-ROM 25 sends the stored frame number and the like to a decoder 24 under the control of the decoder 24. The decoder 24 decodes the reception signal demodulated by the receiver 23 and compares it with the address data supplied from the ID-ROM 25. If coincidence is detected, the decoder 24 sends the decoded data to the CPU 21. The decoder 24 ON/OFF-controls a switch SW$_2$. When the switch SW$_2$ is turned on, it supplies power supplied from a power source 26 via a switch SW$_1$ to the receiver 23. The switch SW$_1$ is turned on/off by an operation of a user. When the switch SW$_1$ is turned on, it supplies the power supplied from the power source 26 to the decoder 24, and the switch SW$_2$.A message memory 27 stores a received message. A switch circuit 28 includes a plurality of switches (switches SW$_3$ to SW$_5$ in FIG. 3) and sends a switch input signal corresponding to an operated switch to the CPU 21. An LED driver 29 flashes an LED 30 under the control of the CPU 21, thereby indicating that the receiver is called. A buzzer driver 31 drives a buzzer 32 under the control of the CPU 21, thereby indicating that the receiver is called and the like. A display 33 displays the received message stored in the message memory 27 and the like under the control of the CPU 21.

Figure 5:
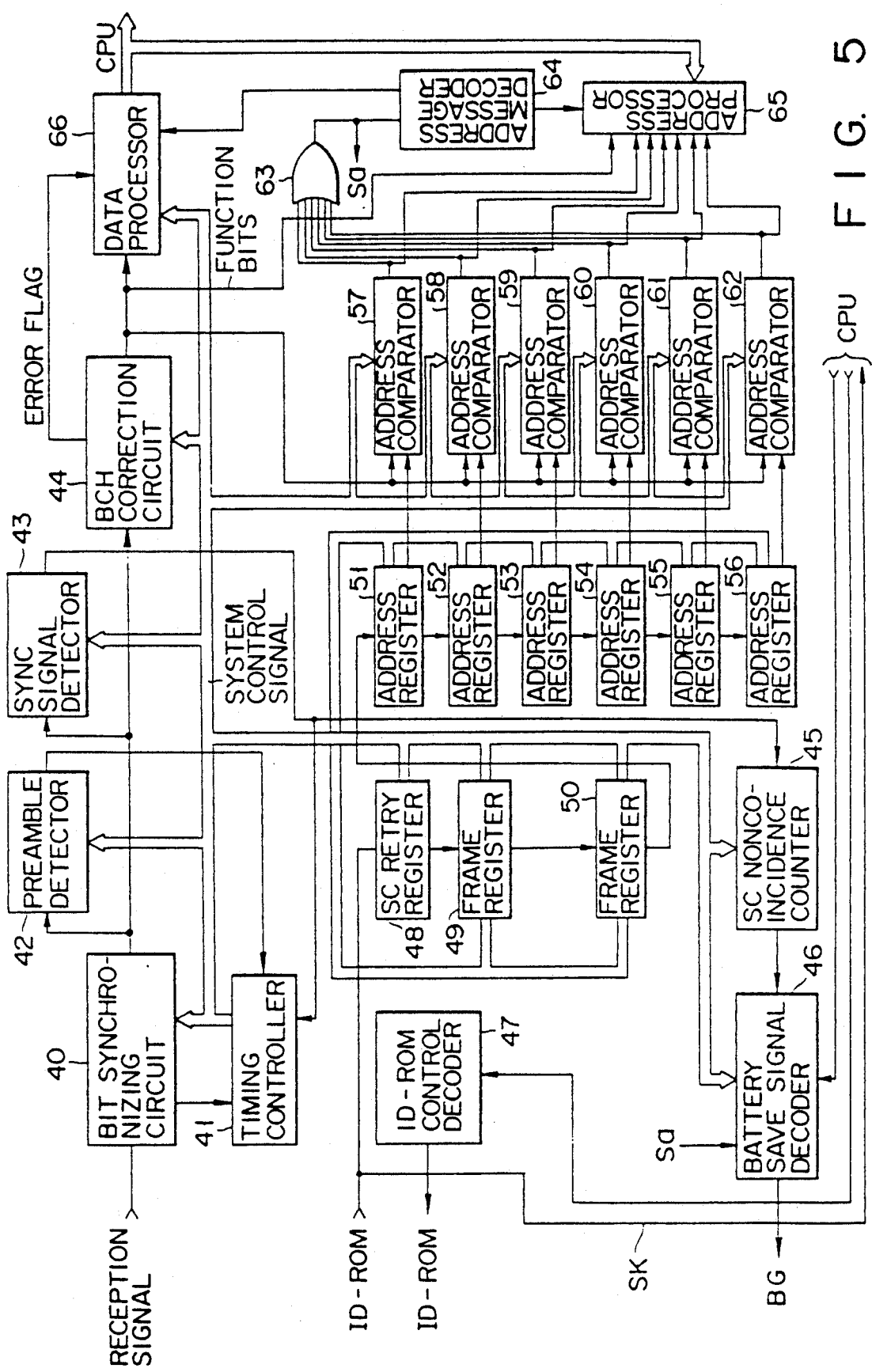
FIG. 5 is a block diagram showing an arrangement of a decoder unit shown in FIG. 4.

FIG. 5 shows an arrangement of the decoder 24 in detail. A bit synchronizing circuit 40 receives a reception signal including a bit string of "1" and "0" demodulated by the receiver 23. The bit synchronizing circuit 40, having a bit synchronizing counter, synchronizes the input bit string with an internal clock supplied from a timing controller 41 to be described below. The bit synchronizing circuit 40 sends the reception signal as the synchronized bit string to a preamble detector 42, a sync signal detector 43, and a BCH correcting circuit 44. The timing controller 41 has an oscillator, a 32-scale bit counter, a 17-scale word counter, and the like. The timing controller 41 generates clock signals having the same frequency as the reception signal and higher frequency. The timing controller 41 also performs timing control of the overall decoder 24 in response to detection signals from the preamble detector 42 and the sync signal detector 43, thereby determining a signal read timing and an operation order of the respective circuits. The preamble detector 42 detects the preamble signal A in the reception signal, i.e., the bit string from the bit synchronizing circuit 40. When the preamble detector 42 detects eight successive bits of repeating data of "0" and "1" (i.e., 01010101 or 10101010), it determines that the preamble signal A is detected and sends a detection signal to the timing controller 41.

The sync signal detector 43 detects a sync code SC in the reception signal and sends a detection signal to the timing controller 41 and an SC noncoincidence counter 45 to be described below. As shown in FIGS. 1C and 1D, the BCH correcting circuit 44 performs BCH error-correcting processing for the reception signal including a BCH parity code. The BCH correcting circuit 44 sends corrected data to a data processor 66 and address comparators 57 to 62. If an uncorrectable error occurs, the BCH correcting circuit 44 sends a signal for an error flag to the data processor 66. The SC noncoincidence counter 45 has a counter which is incremented by one by a carry output from the word counter in the timing controller 41 and reset by the detection signal from the sync signal detector 43. This counter counts the number of non-detection of the sync signal, in series, which should be detected in a predetermined frequency. When the count value of the counter reaches an allowable number of step-out set in an SC retry register 48, the timing controller 41 sends a signal to a battery save signal decoder 46 to execute a preamble detecting operation again. The battery save signal decoder 46 receives the signal from the timing controller 41, frame registers 49, 50, the SC noncoincidence counter 45, or the CPU 21 and ON/OFF-controls the switch SW$_2$.

An ID-ROM control decoder 47 receives a signal SK supplied from the CPU 21 when the switch SW$_1$ is turned on and supplies a signal to and controls the ID-ROM 25. The SC retry register 48, frame registers 49 and 50, and address registers 51 to 56 set data sequentially supplied from the ID-ROM 25 under the control of the ID-ROM control decoder 47. An allowable number of stepout is set in the SC retry register 48. A frame number 2 (second frame) assigned to the paging receiver and used upon individual calling is set in the frame register 49. A frame number 8 (eighth frame) used upon information service is set in the frame register 50. An address which should be compared with addresses received in a frame of the number set in the frame register 49 i.e., individual calling address is set in each of the address registers 51 and 52. First individual calling address used when only the corresponding one receiver is to be individually called is set in the address register 51. Second individual calling address used when emergency calling is performed and/or receivers belonging to a group consisting of a plurality of receivers (these receivers are assigned with the same frame) are to be simultaneously called is set in the address register 52. The address registers 51 and 52 are controlled by the frame register 49 under the control of the timing controller 41 and sends the set addresses to the address comparators 57 and 58, respectively. Addresses which should be compared with an address received in a frame of the number set in the frame register 50 are set in the address registers 53 to 56. That is, addresses for receiving pieces of contract information such as gold quotation information, stock price information of a company A, a weather report of a specific area, and horse racing information are set in the address registers 53, 54, 55, and 56, respectively. The address registers 53 to 56 are controlled by the frame register 50 under the control of the timing controller 41. The address registers 53 to 56 send the set addresses to the address comparators 59 to 62, respectively. The address comparators 57 to 62 are controlled by the timing controller 41. The address comparators 57 to 62 compare the reception address supplied from the BCH correcting circuit 44 with the addresses supplied from the address registers 51 to 56. When the reception address coincides with any one of the addresses, a corresponding one of the address comparators 57 to 62 sends a coincidence detection signal to an OR gate 63 and an address processor 65. An output signal Sa of the OR gate 63 is supplied to the battery save signal decoder 46, to cause the decoder 46 to receive paging signal continuously, and is supplied also to the address message decoder 64. An address message decoder 64 receives the signal supplied via the OR gate 63 and supplies an operation command signal to the address processor 65. After a predetermined time elapses, the address message decoder 64 supplies an operation command signal to the data processor 66. The address processor 65 receives the operation command signal from the address message decoder 64 and starts an operation. The address processor 65 outputs an 8-bit parallel signal including six output bits from the address comparators 57 to 62 and two function bits included in the reception address codeword. The data processor 66 receives the operation command signal from the address message decoder 64 and starts an operation. The data processor 66 is an S-P converter for converting the message given as serial data from the BCH correcting circuit 44 under the control of the timing controller 41 into parallel data used in the CPU 21 and sending the converted data.

Figure 6:
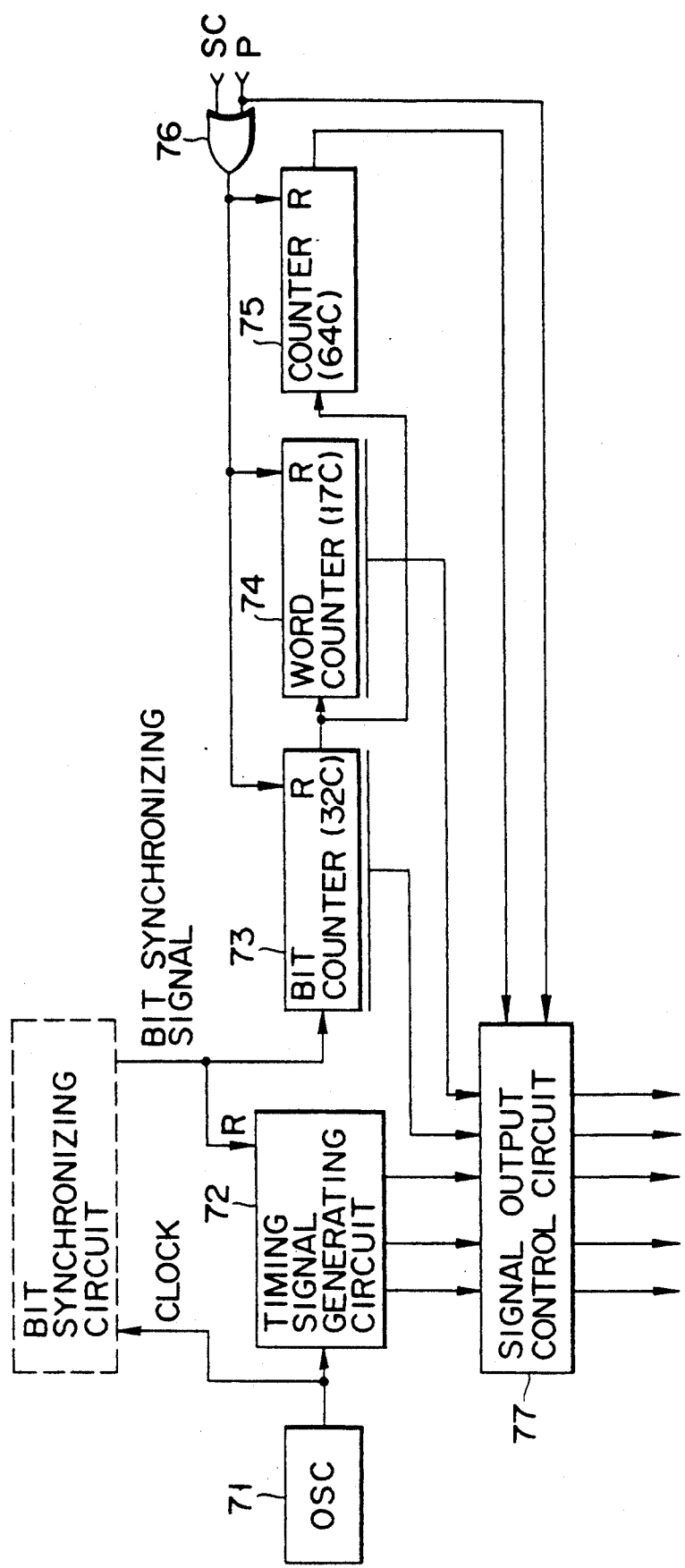
FIG. 6 is a block diagram showing an arrangement of a timing controller shown in FIG. 5.

An arrangement of the timing controller 41 will be described in detail below with reference to FIG. 6. An oscillator 71 supplies a clock signal to the bit synchronizing circuit 40 and a timing signal generating circuit 72. The clock signal has a frequency sixteen times of a clock frequency of the transmission data. The timing signal generating circuit 72 is reset by a bit synchronizing signal from the bit synchronizing circuit 40. The timing signal generating circuit 72 generates various kinds of control signals synchronizing with the received signal. The bit synchronizing signal is supplied to a 32-scale bit counter 73 as a count-up signal. A carry signal of the bit counter 78 is supplied to 17-scale word counter 74 and a 64-scale counter 75. The preamble detection signal P, and a synchronizing signal detection signal SC are supplied to reset terminals of the counter 73, 74, 75 through an OR gate 76. A signal generation control circuit 77 generates control signals based on the timing signal from timing signal generating circuit 72, the output data from bit counter 78 and word counter 79, the carry signal from the counter 75, and the preamble detection signal P. The signal generation control circuit 77 supplies generated control signals and count value data to the respective circuits shown in FIG. 5.

Figure 7:
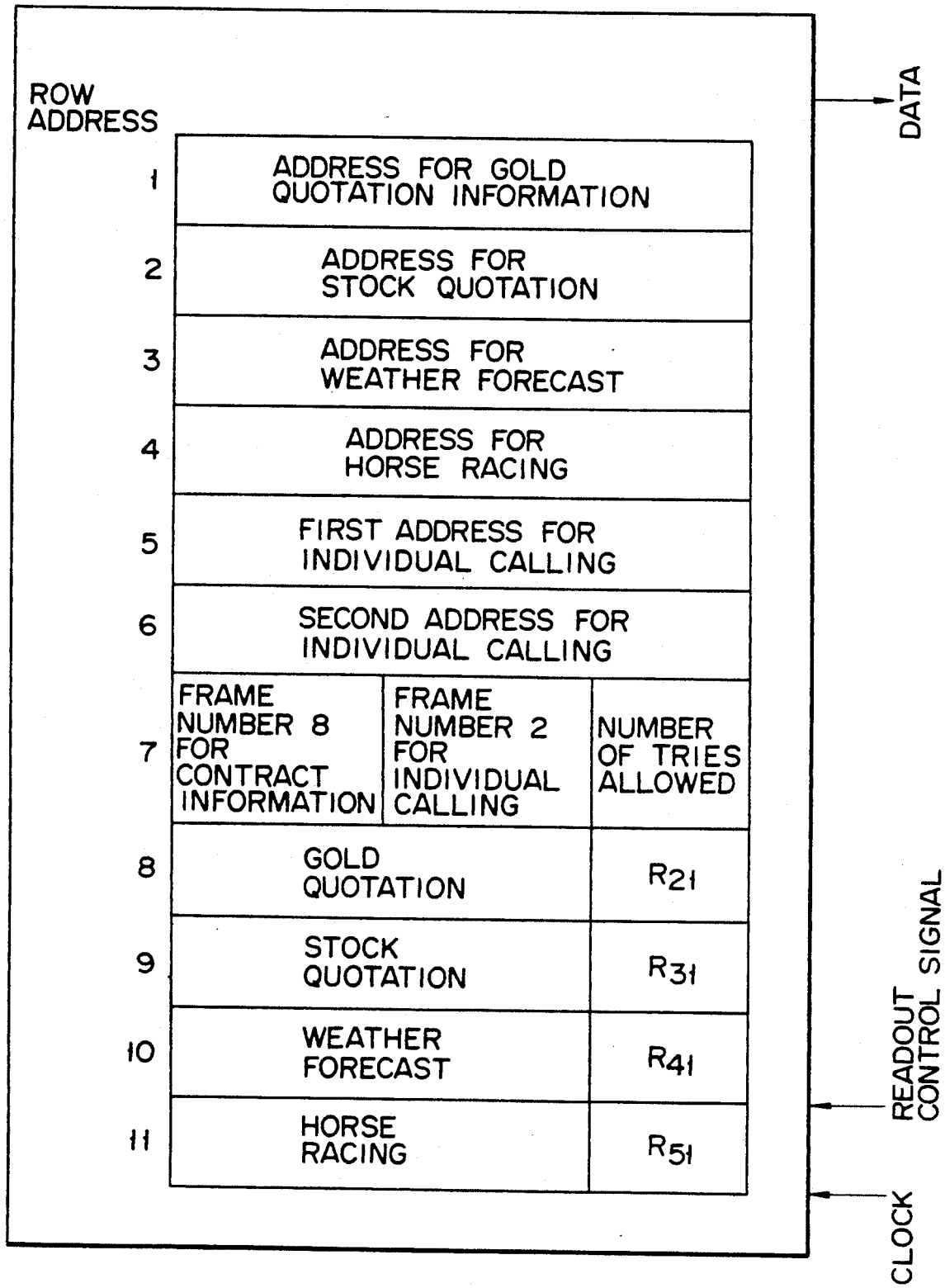
FIG. 7 is a memory map showing an internal arrangement of an ID-ROM shown in FIG. 4.

A format of the ID-ROM 25 will now be described below with reference to FIG. 7. As shown in FIG. 7, the ID-ROM 25 has a 11-row memory areas. In memory areas of first to fourth rows, addresses for receiving the information from the information service company, for example, addresses for receiving gold quotation information, stock quotation information, weather forecast information, and horse racing information are set. In memory areas of fifth and sixth rows, first and second addresses for individual calling are set. In memory area of seventh row, a frame number for simultaneous calling, in this embodiment, 8, a frame number for individual calling, in this embodiment, 2, and a number of try allowed set in the SC retry register 48, in this embodiment, 2 are set. In memory areas of eighth to eleventh rows, type of information and start address of each storage area of the message memory 27 for storing the received information are set.

Data representing that this information is gold quotation information; and a start address R21 of a storage area of the message memory 27 for storing the gold quotation information are set in the memory area of the eighth row. Data representing that this information is stock quotation information; and a start address R31 of a storage area of the message memory 27 for storing the stock quotation information are set in the memory area of the ninth row. Data representing that this information is weather forecast information; and a start address R41 of a storage area of the message memory 27 for storing the weather forecast information are set in the memory area of the tenth row. Data representing that this information is horse racing information; and a start address R51 of a storage area of the message memory 27 for storing the horse racing information are set in the memory area of the eleventh row. A control terminal of the ID-ROM 25 receives the readout control signal, the clock signal, and the like from the ID-ROM control decoder 47.

Figure 8:
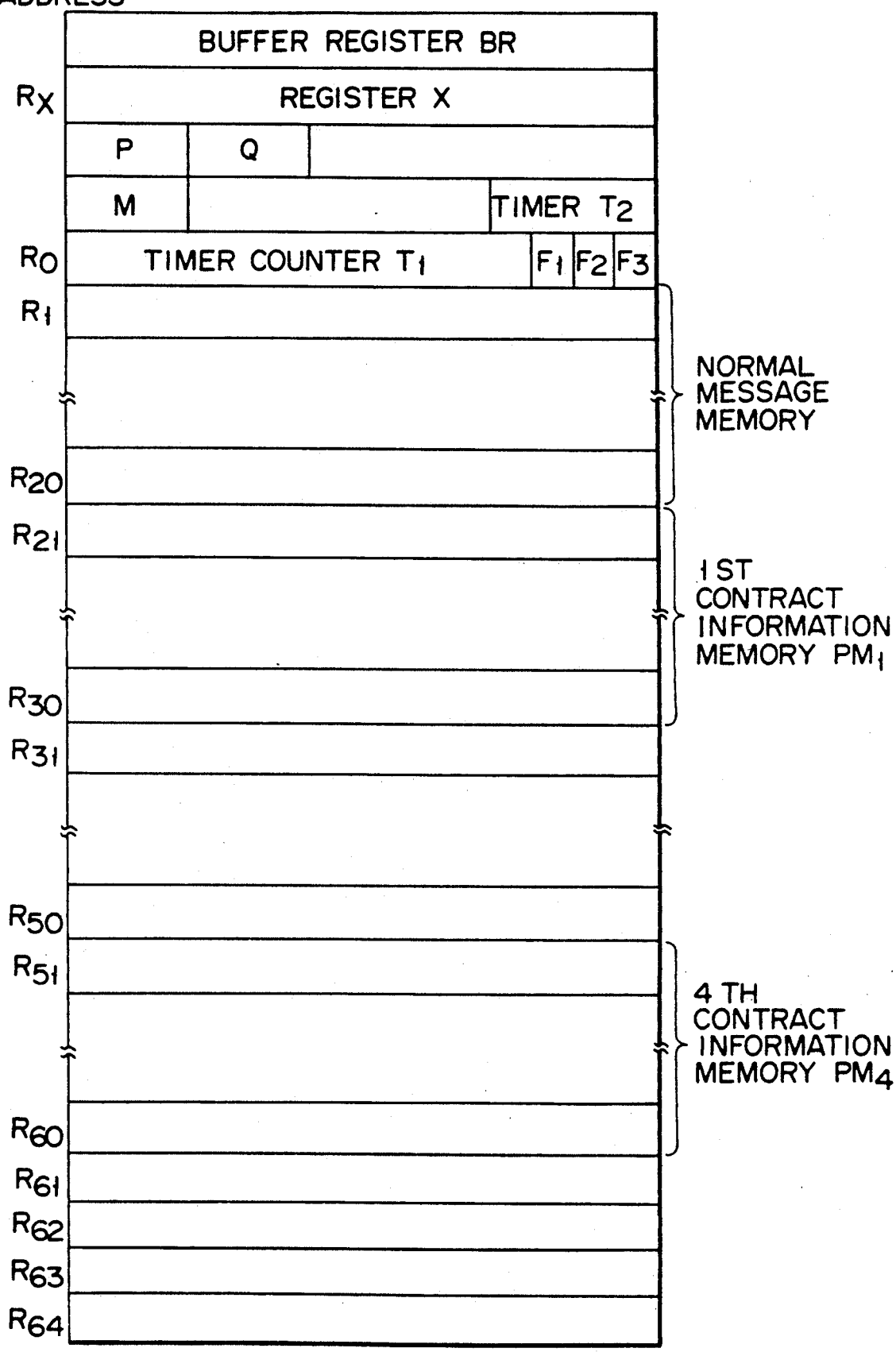
FIG. 8 is a memory map showing an internal arrangement of a message memory shown in FIG. 4.

A format of the message memory 27 will be described below with reference to FIG. 8. Referring to FIG. 8, a buffer register BR temporarily stores the received data supplied from the decoder 24 to the CPU 21. A row register X at a row address Rx stores a start address of a memory area of the message memory 27 in which the type of now-displayed contract information and the contract information are stored. A row address of an arbitrary row of the message memory 27 is set in a display pointer P. The display 14 displays a row designated by the contents of the display pointer P or displays the contents of a register or the like in the designated row. A mode counter M is a ternary counter. When the value of the counter M is 0, it designates a normal mode; when its value is 1, it designates a contract information display mode; when its value is 2, it designates a time correction mode. In the normal mode, the display 14 displays a current time and a normal reception message (a message except for an information message which can be received by the contract, e.g., a message sent upon individual calling). In the contract information display mode, an information message and the like received on the basis of the contract is displayed on the display 14. In the time correction mode, a time of a timer register T1 (to be described later) is corrected. A pointer Q is used for selecting row address to be described later. By selecting the row address, one of first contract information (the gold quotation information), second contract information (the stock quotation information), third contract information (the forecast information), and fourth contract information (the horse race information) can be selected. A timer T2 is used to measure a predetermined time so that the buzzer 32 generates a sound and/or the LED 30 is flashed for the predetermined time. A current time is set in the timer register T1. Flags F1 to F3 designate digits to be corrected in the above time correction mode.

Memory areas of row addresses R1 to R20 constitute a normal message memory UM. The normal message memory UM stores the above normal reception message (including the type of calling and an incoming time). The row addresses R21 to R60, first to fourth contract information memories $PM_1$ to $PM_4$ are constituted in units of ten rows. The first contract information memory $PM_1$ stores received gold quotation information in an order of reception, the second contract information memory $PM_2$ stores received stock quotation information in an order of reception, the third contract information memory $PM_3$ stores received weather forecast information in an order of reception, and the fourth contract information memory $PM_4$ stores received horse racing information in an order of reception. Memory areas from row addresses R61 to R64 store the data read from memory areas of eight to eleventh rows of the ID-ROM 25.

An operation of the paging receiver having the above arrangement will be described with reference to FIGS. 5, 9A to 9C, and 10A and 10B.

When a user turns on the switch $SW_1$ shown in FIG. 3 (FIG. 9B), the CPU 21 detects this and outputs a start signal SK to the ID-ROM control decoder 47 of the decoder 24. In response to the signal, the ID-ROM control decoder 47 supplies a control signal to the ID-ROM 25. In response to the control signal, the ID-ROM 25 outputs its storage data. Of the various data stored in the ID-ROM 25, data stored in memory areas of first to seventh rows, i.e., address data, frame data, and SC retry data are set in the address registers 51 to 56 included in the decoder 24, the frame registers 49 and 50, and the SC retry register 58. The data stored in the memory areas of eighth to eleventh rows of ID-ROM 25, i.e., names of the contract information and the start addresses of the memory areas of the message memory 27 storing the contract information, are stored in the memory areas of row addresses R61 to R64 of the message memory 27 through the CPU 21. After the CPU 21 outputs the start signal SK to the ID-ROM control decoder 47, it sends a control signal SB to the battery save signal decoder 46. In response to the control signal SB, the battery save signal decoder 46 starts a preamble search operation. More specifically, the decoder 46 sets the switch $SW_2$ in an ON state only while a one-word time (time required for transmitting one-word data) at a period of 17-word time as shown in FIG. 9C. As shown in FIG. 9A, a preamble signal A is continuously supplied for an 18-word time at a time. Therefore, while the preamble signal A is supplied twice, the switch $SW_2$ is inevitably turned on for a time interval in which the preamble signal A is transmitted. When the switch SW2 is turned on, power is supplied from the power source 26 to the receiver 23 via the switches $SW_1$ and $SW_2$ (FIG. 4). The preamble signal A is supplied as a bit string to the bit synchronizing circuit 40 of the decoder 24 via the antenna 22 and the receiver 23. The preamble signal A is synchronized with a circuit operation timing by the bit synchronizing circuit 40 and supplied to the preamble detector 42. The preamble detector 42 detects that the supplied signal is the preamble signal A, i.e., the supplied signal is a repeating pattern of "0" and "1", and supplies a detection signal to the timing controller 41. In response to the detection signal, the timing controller 41 supplies a control signal to the battery save signal decoder 46 and continuously sets the switch $SW_2$ in the ON state (FIG. 9C). The sync signal detector 43 sequentially receives the bit string from the bit synchronizing circuit 40. Each time a new bit is supplied, the detector 43 combines the new bit with 31 immediately preceding bits to generate data of 32 bits (this is the number of bits of one word, i.e., a sync code SC), and checks whether the data coincides with a predetermined sync code pattern. When the detector 43 detects the sync code SC in the reception data, it outputs a detection signal and resets the bit counter 78 and the word counter 79 in the timing controller 41. The timing controller 41 supplies a control signal to the battery save signal decoder 46. In response to the control signal, the decoder 46 repeatedly turns on the switch $SW_2$ at a timing at which the sync code SC is supplied and at timings at which the frames 2 and 8 are transmitted, as shown in FIGS. 10A and 10B. As a result, the power is supplied to the receiver 3 only at the timings at which the sync code SC and the frames 2 and 8 are transmitted (the power is actually supplied at a timing about an 8-bit time before these timings), thereby performing a reception operation. That is, in order to save power, the decoder 24 turns on the receiver 23 only when there is a possibility that the paging receiver is called and performs the reception operation. Note that if the sync code SC is not detected within a 64-word time after the above sync code search operation is started, the preamble search operation is performed again.

At the timing of reception of the second frame, the receiver 23 is turned on to receive an address codeword. The received address codeword is supplied from the bit synchronizing circuit 40 to the BCH correcting circuit 44. The BCH correcting circuit 44 performs BCH error correction processing for the reception data and supplies corrected reception data to the address comparators 57 to 62. At the frame 2 reception timing, the timing controller 41 supplies a control signal to the frame register 49 regardless of the presence/absence of reception of the above address. In response to the control signal, the frame register 49 supplies a control signal to the address registers 51 and 52. In response to this control signal, address data set in the address registers 51 and 52 are supplied as bit strings to the address comparators 57 and 58.

The address comparators 57 and 58 check whether the paging receiver is called. More specifically, when an address is supplied from the BCH correcting circuit 44, the address comparator 57 compares the supplied address with the address supplied from the address register 51 and checks whether the two addresses coincide with each other. When an address is supplied from the BCH correcting circuit 44, the address comparator 58 compares the supplied address with the address supplied from the address register 52 and checks whether the two addresses coincide with each other. When either the address comparator 57 or 58 detects a coincidence of the addresses this address comparator supplies a detection signal to the OR gate 63 and the address processor 65. The address message decoder 64 receives the detection signal supplied via the OR gate 63 and sends an operation command signal to the address processor 65. In response to the operation command signal, the address processor 65 converts the output signals from the address comparators 57 to 62 and function bit data included in the received address codeword into a parallel bit signal used in the CPU 21 and sends the, signal to the CPU 21. The CPU 21 stores the parallel bit signal in the buffer register BR of the message memory 27.

After the above operation, the address message decoder 64 sends an operation command signal to the data processor 66. In response to this operation command signal, the data processor 66 sequentially fetches a bit string of a message part of the message codeword supplied next to the address codeword from the BCH correcting circuit 44, converts the bit string into a parallel bit signal, and sends the converted signal to the CPU 21.

The CPU 21 stores the supplied message in the buffer register BR of the message memory 27. CPU 21 determines that the data is message data, and checks erroneous reception or the like. After that, CPU 21 stores the message into respective memory area of the message memory 27, and causes the display 14 to display the message.

The CPU 21 which received this data sends an operation command signal to the buzzer driver 31 based on the data, from the address processor 65, stored in the buffer register BR. The buzzer driver 31 drives the buzzer 32 to generate a sound. The CPU 21 also sends the operation command signal to the LED driver 29 to flash the LED 30. Therefore, a user can easily recognize that calling is made.

When an address is received at the timing of the frame number 8, the received address is supplied from the bit synchronizing circuit 40 to the BCH correcting circuit 44. The BCH correcting circuit 44 performs the BCH error correction processing for the reception data. The corrected reception data is supplied to the address comparators 57 to 62. At the above timing, a control signal is supplied from the timing controller 41 to the frame register 50 regardless of the presence/absence of reception of the address. In response to this control signal, the frame register 50 supplies a control signal to the address registers 53 to 56, and the addresses set in these registers are supplied to the address comparators 59 to 62.

When the addresses are supplied via the BCH correcting circuit 44, the address comparators 59 to 62 compare the supplied addresses with the addresses assigned to the paging receivers and supplied from the address registers 53 to 56, respectively. When any of the address comparators 59 to 62 detects a coincidence of the addresses (i.e., when a calling is made for the paging receiver), this address comparator sends a detection signal to the address message decoder 64 via the OR gate 43. In response to the detection signal, the address message decoder 64 supplies an operation command signal to the address processor 65. The address processor 65 converts output signals from the address comparators 57 to 62 and function bit data included in the received address codeword into a parallel bit signal and sends the converted signal to the CPU 21. The CPU 21 stores the parallel bit signal into the buffer register BR.

After the above operation, the address message decoder 64 sends an operation command signal to the data processor 66. In response to this operation command signal, the data processor 66 sequentially fetches a bit string of a message part of the message codeword supplied next to the address code from the BCH correcting circuit 44. The processor 66 converts the fetched message into a parallel bit signal used in the CPU 21 and sends the converted signal to the CPU 21.

The CPU 21 stores the supplied message into the buffer register BR. The CPU 21 executes predetermined checks for the supplied message and displays the message on the display 14.

In accordance with the contents of the parallel bit signal from the address comparator 65, the CPU 21 selects a corresponding contract information storage area in the message memory 27 and stores the data stored in the buffer register BR into the selected memory area. Since received message is contract information, the CPU 21 need not perform call alarming by the LED 30 or buzzer 32 as in the case of individual or group calling. Note that ON/OFF setting of call alarming may be performed by a user for each address.

In this manner, the CPU 21 displays the message included in the message codeword next to the address assigned thereto on the display 14. When a start bit (message bit) of the supplied codeword becomes "0", i.e., another address codeword begins, the CPU 21 sends a signal SB to the battery save signal decoder 46. In response to the signal SB, the decoder 46 releases the continuous ON state of the switch SW2 to restore the normal intermittent reception operation.

An operation of the CPU 21 will be described below.

FIG. 11 is a flow chart showing an operation of the CPU 21. The CPU 21 is normally supplied with power from the power source 26 regardless of the ON/OFF state of the main switch SW1 and waits for message reception, supply of a count timing signal, or supply of a key input signal (step G1). When a message is received, the CPU 21 performs incoming processing (G2). The incoming processing will be described later. When a count signal is supplied from the timer circuit 34, the CPU 21 performs count/timer processing (G3). When a key input signal is supplied from the switch circuit 28, the CPU 21 performs key processing (G4). The key processing will be described later.

When the CPU 21 determines on the basis of the above operation of the decoder 24 that the received address is address assigned thereto, it executes the incoming processing G2.

Figure 12:
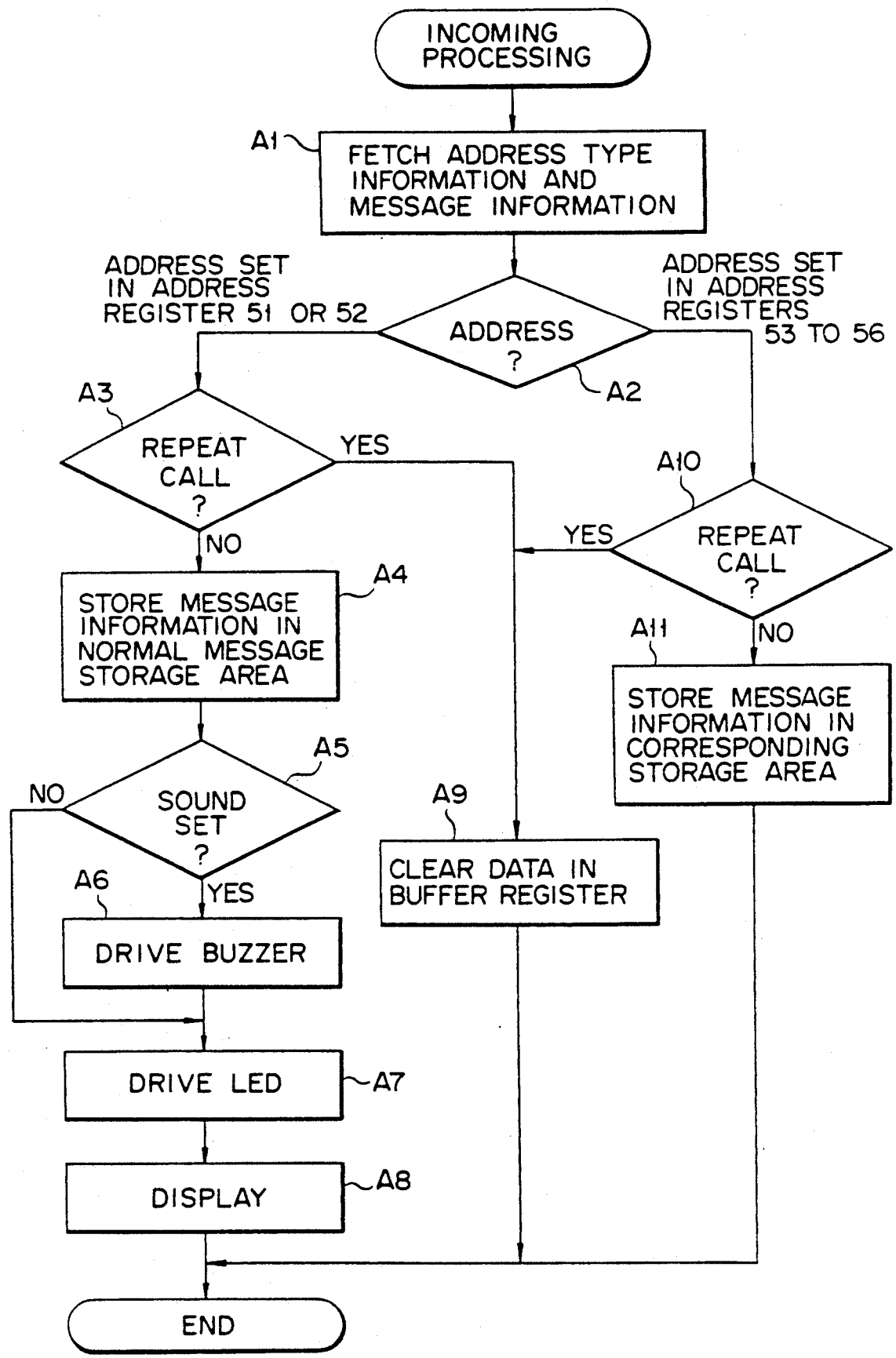
FIG. 12 is a flow chart for explaining incoming call processing of the paging receiver according to the embodiment of the present invention.

The incoming processing will be described in detail below with reference to FIG. 12.

The CPU 21 temporarily sets an address type information (information from address processor 65), and message data in the buffer register BR of the message memory 27. When reception of the message is finished, the CPU 21 sends the signal SB to the battery save signal decoder 46 to intermittently turn on the switch SW2 (step A1). The CPU 21 checks on the basis of the address type information, i.e., the parallel bit signal from the address processor 65 whether the received address coincides with the addresses set in the address registers 51 and 52 or coincides with the addresses set in the address registers 53 to 56.

If the received address coincides with any one of the addresses set in the address registers 51 and 52, the control flow advances to step A3. In this case, an individual calling signal is received. As described above, in order to prevent erroneous reception, a message of the same contents is transmitted from the base station twice in 60 seconds. For this reason, the CPU 21 checks in step A3 whether current reception is the second reception of the same contents (repeat call). If the current reception is the repeat call, the CPU 21 clears the buffer register BR (step A9) to end the incoming processing. If the current reception is not the repeat call, the CPU 21 stores the address type information, the function bits data and message stored in the buffer register BR and the contents of timer register T1 in the normal message memory UM (step A4). The CPU 21 checks whether the buzzer 32 is set to generate a sound upon message reception (step A5). If the buzzer 32 is set not to generate a sound, the flow advances to step A7. If the buzzer 32 is set to generate a sound, the CPU 21 sends a control signal to the buzzer driver 31 to drive the buzzer 32 (step A6). In step A7, the CPU 21 causes the LED driver 29 to drive the LED 30, thereby flashing the LED 30. Thereafter, the CPU 21 displays the address type information, message, and the like stored in the normal message memory UM and related to the current reception on the display 14 (step A8) and ends the incoming processing.

If the received address coincides with any one of the addresses set in the address registers 53 to 56 in step A2, the control flow advances to step A10. In this case, a contract information is received. That is, a calling signal for transmitting a message to a plurality of paging receivers regardless of assigned frames is received. In step A10, the CPU 21 checks whether the current reception is the repeat call, as in step A3.

If the current reception is the repeat call, the CPU 21 executes the processing in step A9 and ends the incoming processing. If the current reception is not the repeat call, the CPU stores the received address type information, the function bits data, and message, and the reception time (contents of time register T1) is the contract information memory of the message memory 27 (step A11) and ends the incoming processing. At this time, the CPU 21 checks the address type information and stores the reception data and reception time in an empty area of the contract information memory PM corresponding to the received contents. When gold quotation information is received, for example, the CPU 21 stores the reception data in the start address of an empty area of the first contract information memory PM1. Similarly, when stock quotation information is received, the CPU 21 stores the reception data in the start address of an empty area of the second contract information memory PM2.

Key processing will be described below with reference to FIG. 13.

Figure 13:
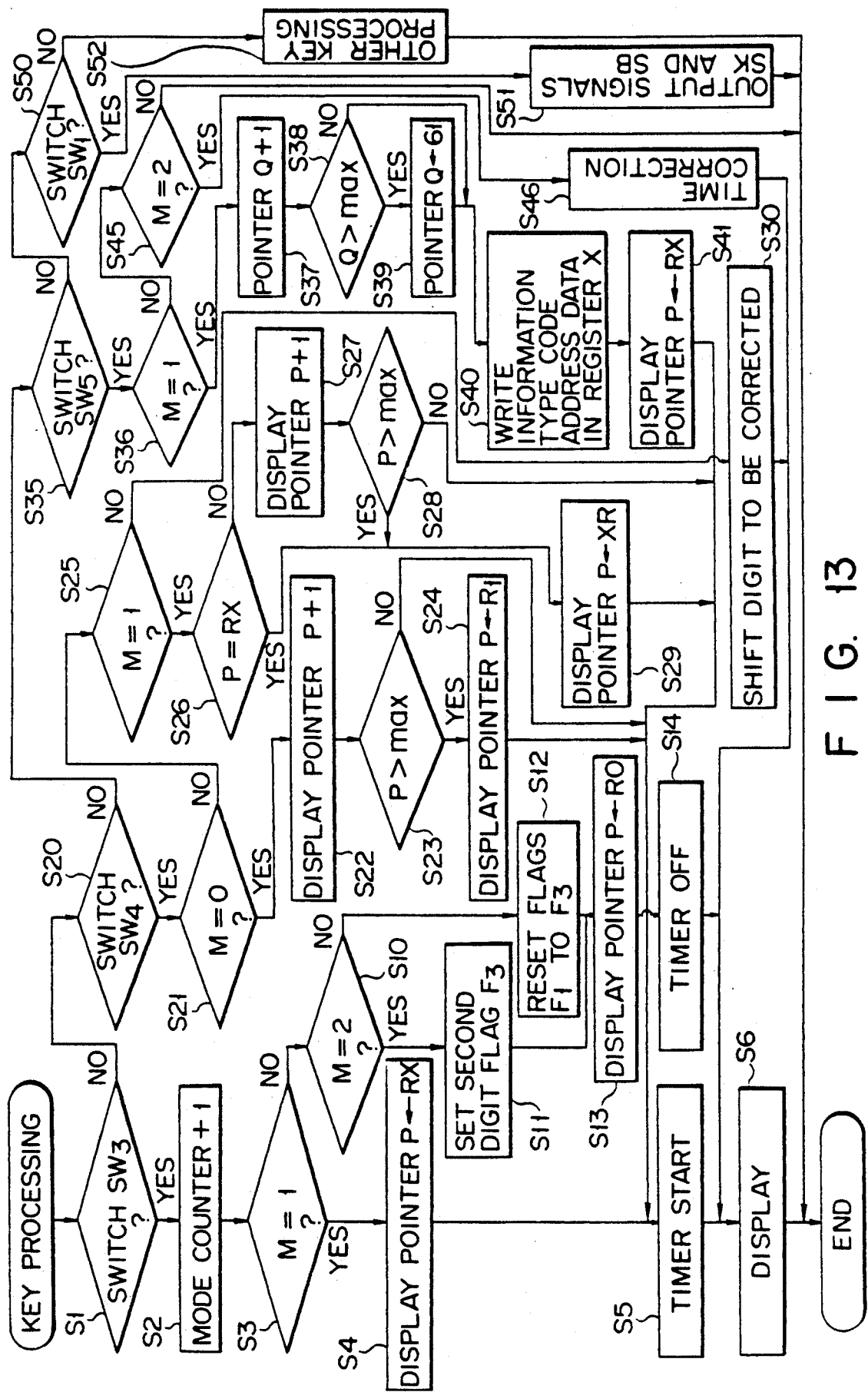
FIG. 13 is a flow chart for explaining key processing of the paging receiver according to the embodiment of the present invention.

In response to a switch operation signal from the switch circuit 38, the CPU 21 executes switch processing shown in FIG. 13.

An operation of the main switch SW1 is detected in step S50 via steps S1, S20 and S35. In step S51, the CPU 21 supplies a start signal SK to the ID-ROM control decoder 25 and supplies a control signal SB to the battery save signal decoder 26. As a result, the decoder 24 executes the preamble detection operation.

An operation of the mode switch SW3 is detected in step S1, and the CPU 21 increments the count value of the mode counter M by one. As a result, if the contract information display mode (M=1) is set, the control flow advances to step S4 to set the row address Rx in the display pointer P. The CPU 21 causes the timer T2 to start a timer operation (step S5). Thereafter, the contents of the register X designated by the display pointer P, i.e., the type of information and the like are displayed on the display 14 (step S6).

If the time correction mode (M=2) is set by mode switching in step S2, the control flow advances to step S11 via steps S3 and S10. In step S11, the flag F3 is set. As a result, a digit to be corrected is set to a digit of seconds. The CPU 21 sets a row address R0 in the display pointer P, designates the timer register T1 (step S13), and stops an operation of the timer T2 (step S14). The CPU 21 displays a current time registered in the timer register T1 designated by the display pointer P on the display 14 (step S6).

If the normal mode (M=0) is set by mode switching in step S2, the control flow advances to step S12 via steps S3 and S10. In step S12, the flags F1 to F3 are reset. The CPU 21 sets the row address R0 in the display pointer P, designates the timer register T1 (step S13), and stops an operation of the timer T2 (step S14). The CPU 21 displays a current time registered in the timer register T1 designated by the display pointer P on the display 14 (step S6).

If the operated key is the switch SW4, this is detected in step S20 via step S1. The control flow advances to step S21 to check a current mode. If the current mode is the normal mode (M=0), the flow advances to step S22 via step S21. In step S22, the CPU 21 increments the value of the display pointer P by one to set the row designated by the pointer P as a row for the next row address. Note that if the value of the display pointer P is larger than the last row address of the normal message memory UM, i.e., R20, the CPU 21 sets the row address R1 in the display pointer P (steps S23 and S24). After the above processing, the CPU 21 starts the timer operation (step S5) and displays a message stored in the row of the normal message memory UM designated by the pointer P on the display 14 (step S6). As described above, when the switch SW4 is operated in the normal mode, messages of the respectively rows of the normal message memory UM are sequentially displayed on the display 14.

If the switch SW4 is operated in the contract information display mode (M=1), the flow advances to step S26 via steps S1, S20, S21, and S25. In step S26, the CPU 21 checks whether the display pointer P designates the row address Rx, i.e., the register X. If the pointer P designates the register X, the row address XR set in the register X is set in the pointer P (step S29). The timer T2 is started (step S5), and information in the row designated by the pointer P, i.e., the row of the address XR, i.e., received specific contract information is displayed on the display 14 (step S6).

If the CPU 21 determines in step S26 that the display pointer P does not designate the register X, the value of the pointer is incremented by one, and the pointer P designates the next row (step S27). If the designated value of the display pointer P is larger than the last row address (XR+9), this is detected (step S28), and the row address XR set in the register X is set in the pointer P (step S29). The timer T2 is started (step S5), and information in the row designated by the pointer P, i.e., the row of the addresses XR to (XR+9), i.e., received specific contract information is displayed on the display 14 (step S6).

If the switch SW4 is operated in the time correction mode (M=2), the flow advances to step S30 via steps S1, S20, S21, and S25. In step S30, a set flag of the flags F1 to F3 is changed, a digit to be corrected is shifted, and the flow advances to the display processing (step S6).

If the switch SW5 is operated, the flow advances to step S35 via steps S1 and S20. In step S35, the CPU checks a current mode. If the current mode is the contract information display mode (M=1), the flow advances to step S37. In step S37, the value of the pointer Q is incremented by one. As a result, if the value of the pointer Q becomes larger than the last row address 64 of the message memory 27, the value of the pointer Q is reset to an initial value "R61" (step S39). After the above processing, an information type code and a row address (start row address of the contract informationstoring area) of memory areas of row addresses (one of R61 to R64) of the message memory designated by the pointer Q are written in the register X (step S40). The row address Rx is set in the display pointer P (step S41). Thereafter, the flow advances to step S6 via step S5, and the information type and the like selected by the pointer Q are displayed on the display 14. That is, when the switch SW is operated in the contract information display mode, information types stored in an area of the row address R61 to R64 are sequentially displayed on the display 14.

If the switch SW5 is operated in the time correction mode, time correction is executed, and a corrected current time is displayed on the display 14 (steps S35, S36, S45, S6).

In response to a time elapse signal from the timer circuit 34, the CPU 21 updates the values of the timers T1 and T2 in the message memory 27.

In this embodiment, a call operation of simultaneously calling a plurality of paging receivers and supplying predetermined information thereto is performed by using the eighth frame adjacent to the sync codeword (FIGS. 10A and 10B). When simultaneous calling is to be performed by using the eighth frame or the first frame adjacent to the sync codeword, the switch $SW_2$ need not be turned on/off between the sync codeword and the first or eighth frame. Therefore, power can be saved in a plurality of paging receivers for receiving the information.

The present invention is not limited to the above embodiment but can be variously modified without departing from the spirit and scope of the invention. For example, a frame other than the eighth frame can be used in simultaneous calling, or two or more frames can be used in simultaneous calling. In addition, a communication system other than the POCSAG system can be used.

As has been described above in detail, according to the present invention, a calling signal for individually calling each paging receiver or calling paging receivers in units of groups of predetermined number of paging receivers and a calling signal for simultaneously calling a plurality of paging receivers are assigned to different frames, and each paging receiver receives only a specific frame. Therefore, the same information can be transmitted to a plurality of paging receivers with high transmission efficiency.

What is claimed is:
1. A paging system which comprises:
a base station including means for transmitting a signal having a plurality of transmission frames and including a calling signal and a message signal; and
a plurality of paging receives, each of said paging receivers includes means for receiving a calling signal from said base station, means for receiving a message signal next to a calling signal assigned to such paging receiver, and means for displaying said received message signal, said paging receivers being divided into groups, each of the groups being assigned with a specific one of said plurality of transmission frames;
wherein said calling signal transmitting means of the base station includes means for transmitting an individual calling signal for individually calling one of said plurality of paging receivers by using the one specific transmission frame assigned to a group to which said one paging receiver belongs, and transmitting a simultaneous calling signal for simultaneously calling at least two of said plurality of paging receivers which belong to at least two of the groups by using a predetermined on e of said plurality of transmission frames; and
wherein the receiving means of each of said plurality of paging receivers receives the individual and simultaneous calling signals for only the duration of said specific frame assigned to said paging receiver and the duration of said predetermined frame.

2. A system according to claim 1, wherein said predetermined transmission frame is a frame adjacent to a sync code.

3. A system according to claim 1, wherein
said system is a paging system using a POCSAG code, and
said specific frame, which is used for the individual calling, is any one of seven frames of first to eighth frames of the POCSAG code, and said predetermine frame, which is used for the simultaneous calling, is a frame other than said seven frames.

4. A system according to claim 1, wherein the individual calling signal includes a first individual calling signal and a second individual calling signal, the first individual calling signal is used for calling one paging receiver, the second individual calling signal is used for calling at least two paging receivers assigned with the same transmission frame, and the simultaneous calling signal is used for calling a plurality of paging receivers assigned with different transmission frames.

5. A system according to claim 1, wherein
a transmission format has N frames,
said plurality of paging receivers are divided into n groups,
each of said N frames (N>n) is assigned to paging receivers of a respective group,
in order to call at least one paging receiver belonging to a certain group, said calling signal transmitting means of the base station transmits the individual calling signal for said at least one paging receiver in a frame assigned to the group to which said paging receiver belongs, and in order to call at least two paging receivers belonging to a plurality of groups, said base station transmits said simultaneous calling signal in the predetermined frame other than said n frames of said N frames, and
each of said plurality of paging receivers is set in a reception state for receiving the individual and simultaneous calling signals for only the duration of said specific frame assigned to a group to which such paging receiver belongs and the predetermined frame other than said n frames.

6. A system according to claim 1, wherein said system is a paging system using a POCSAG code, and said specific frame, which is used for the individual calling, is any one of first to eighth frames of the POCSAG code, and said predetermined frame, which is used for the simultaneous calling, is one of the first to eighth frames.

7. A system according to claim 1, wherein a transmission format has N frames,
said plurality of paging receivers are divided into n groups,
each of said N frames is assigned to paging receivers of a respective group,
in order to call at least one paging receiver belonging to a certain group, said calling signal transmitting means of the base station transmits the individual calling signal for said at least one paging receiver in a frame assigned to the group to which said paging receiver belongs, and in order to call at least two paging receivers belonging to a plurality of groups, said base station transmits said simultaneous calling signal in the predetermined frame which is one of said N frames, and
each of said plurality of paging receivers is set in a reception state for receiving the individual and simultaneous calling signal for only the duration of said specific frame assigned to a group to which such paging receiver belongs and the predetermined frame.

8. A system according to claim 1, wherein the simultaneous calling signal is a signal for transmitting contract information to said plurality of paging receivers.

9. A system according to claim 1, wherein
each of said plurality of paging receivers includes memory means for storing a code number or a position number of a frame assigned thereto in order to receive the individual calling signal, and memory means for storing at least one address assigned thereto in order to receive the individual calling signal, and
each of said plurality of paging receivers further includes memory means for storing the number of a frame to which the simultaneous calling signal is transmitted in order to receive the simultaneous calling signal, and memory means for storing an address commonly assigned to paging receivers allowed to receive the simultaneous calling signal in order to receive the simultaneous calling signal.

10. A system according to claim 1, wherein each of said paging receivers includes means for determining that the calling signal calls said paging receiver in order that said paging receiver is continuously set in a reception state in response thereto to receive a message signal.

11. A pager for receiving an address signal and a message signal transmitted from a base station, said pager comprising:
frame register means for storing a position number of one of a plurality of transmission frames which is assigned to the pager, and also a position number of a common transmission frame common to the pager and others of said plurality of pagers;
address memory means for storing pager address data corresponding to the position number of the transmission frame which is stored in said frame register means, and also common address data corresponding to the one pager and said other pagers;
receiving means for receiving the address signal transmitted from the base station, only for the duration of the one transmission frame the position number of which is stored in said frame register means and for the duration of the common transmission frame that position number of which is stored in said frame register means;
message signal memory means for storing a message signal transmitted from the base station after the address signal received by said receiving means, when the received address signal is identical to the pager address data or the common address data stored in said address memory means; and
display means for displaying the message signal stored in said message signal memory means.

12. A pager according to claim 11, wherein said address signal and said message signal utilize POCSAG codes, with each POCSAG code comprising eight frames, and in which said transmission frame assigned to the pager is one of seven of the eight frames of such POCSAG code, and said common transmission frame is another of the seven frames.

13. A pager according to claim 11, wherein said address memory means stores a plurality of address data items assigned to the pager.

* * * * *